US012802424B2

(12) United States Patent
Song et al.

(10) Patent No.: US 12,802,424 B2
(45) Date of Patent: Nov. 17, 2026

(54) METHODS FOR TARGET DETECTION BASED ON VISIBLE CAMERAS, INFRARED CAMERAS, AND LIDARS

(71) Applicants: DONGHAI LABORATORY, Zhoushan (CN); ZHEJIANG UNIVERSITY, Zhoushan (CN)

(72) Inventors: Chunyi Song, Zhoushan (CN); Fuyuan Ai, Zhoushan (CN); Hussain Amjad, Zhoushan (CN); Zecheng Li, Zhoushan (CN); Yuying Song, Zhoushan (CN); Zhiwei Xu, Zhoushan (CN)

(73) Assignees: DONGHAI LABORATORY, Zhoushan (CN); ZHEJIANG UNIVERSITY, Zhoushan (CN)

( * ) Notice: Subject to any disclaimer, the term of this patent is extended or adjusted under 35 U.S.C. 154(b) by 209 days.

(21) Appl. No.: 18/762,595

(22) Filed: Jul. 2, 2024

(65) Prior Publication Data

US 2024/0355105 A1 Oct. 24, 2024

(30) Foreign Application Priority Data

Mar. 4, 2024 (CN) ........................ 202410239293.2

(51) Int. Cl.

| | |
|---|---|
| ***G06V 10/143*** | (2022.01) |
| ***G01J 5/08*** | (2022.01) |
| ***G06T 7/20*** | (2017.01) |
| ***G06T 7/55*** | (2017.01) |
| ***G06V 10/774*** | (2022.01) |

(Continued)

(52) U.S. Cl.
CPC .......... *G06V 10/806* (2022.01); *G01J 5/0859* (2013.01); *G06T 7/20* (2013.01); *G06T 7/55* (2017.01); *G06V 10/143* (2022.01); *G06V 10/774* (2022.01); *G06V 10/82* (2022.01); *G06V 20/58* (2022.01); *G01J 2005/0077* (2013.01); *G06T 2207/10028* (2013.01); *G06T 2207/10048* (2013.01); *G06T 2207/20016* (2013.01); *G06T 2207/20081* (2013.01); *G06T 2207/20084* (2013.01); *G06T 2207/30261* (2013.01); *G06V 2201/07* (2022.01)

(58) Field of Classification Search
None
See application file for complete search history.

(56) References Cited

U.S. PATENT DOCUMENTS 11,532,168 B2 * 12/2022 Smolyanskiy ..... B60W 60/0011
12,164,059 B2 * 12/2024 Smolyanskiy ..... B60W 60/0011
(Continued)

*Primary Examiner* — Tsung Yin Tsai
(74) *Attorney, Agent, or Firm* — PORUS IP LLC

(57) ABSTRACT

A method for target detection based on a visible camera, an infrared camera, and a LiDAR is provided. The method designates visible light images, infrared images, and LiDAR point clouds, which are synchronously acquired, as inputs, and generates an input pseudo-point cloud using visible light images and infrared images, to realize alignment of multi-modal information in a three-dimensional space and fusion feature extraction. Then the method adopts a cascade strategy to output more accurate target detection results step by step. In the present disclosure, different characteristics of multi-sensors are complemented, which improves and extends traditional target detection algorithms, improves the accuracy and robustness of target detection, and realizes multi-category target detection in a road scene.

10 Claims, 5 Drawing Sheets

(51) Int. Cl.

| | |
|---|---|
| ***G06V 10/80*** | (2022.01) |
| ***G06V 10/82*** | (2022.01) |
| ***G06V 20/58*** | (2022.01) |
| *G01J 5/00* | (2022.01) |

(56) References Cited

U.S. PATENT DOCUMENTS

| | | | | |
|---|---|---|---|---|
| 2007/0247517 | A1* | 10/2007 | Zhang | G06T 3/153 348/30 |
| 2014/0168378 | A1* | 6/2014 | Hall | H04N 13/257 348/47 |
| 2018/0349746 | A1* | 12/2018 | Vallespi-Gonzalez | G01S 7/4808 |
| 2019/0108396 | A1* | 4/2019 | Dal Mutto | G06F 18/24 |
| 2019/0265714 | A1* | 8/2019 | Ball | G05D 1/024 |
| 2021/0150227 | A1* | 5/2021 | Hu | G06T 7/11 |
| 2021/0342609 | A1* | 11/2021 | Smolyanskiy | B60W 60/0011 |

* cited by examiner

METHODS FOR TARGET DETECTION BASED ON VISIBLE CAMERAS, INFRARED CAMERAS, AND LIDARS

CROSS-REFERENCE TO RELATED APPLICATIONS

This application claims priority to Chinese Patent Application No. 202410239293.2, filed on Mar. 4, 2024, the entire contents of which are incorporated herein by reference.

TECHNICAL FIELD

The present disclosure relates to the field of multimodal target detection, and in particular, to methods for target detection based on visible cameras, infrared cameras, and LiDARs.

BACKGROUND

Target detection is a key research technology in the field of computer vision, and its application covers a wide range of fields such as automated driving, intelligent surveillance, and unmanned aerial vehicle navigation.

Despite the remarkable progress has been made by target detection techniques in recent years, there are some drawbacks and limitations. One of the prominent issues is that most of the target detection algorithms are very sensitive to light and weather conditions, and may suffer from degradation of performance in harsh environments. For example, under strong light or shadows, or in rain or snow, traditional vision sensors may perform poorly, resulting in missed or false detections of targets.

In response to the above problems, target detection using a combination of sensors of visible cameras, infrared cameras, and LiDARs is an effective solution. The visible camera is suitable for daytime and good lighting conditions, the infrared camera performs better at night or in low-light conditions, and the LiDAR is suitable for most lighting conditions. In addition, visible light images provide rich color and texture information, infrared images reflect thermal distribution characteristics of the target, and the LiDAR provides accurate distance and shape information. The combined use of these sensors not only improves the robustness of the system to different lighting conditions, but also acquires multi-dimensional target information, which helps to more accurately understand the characteristics of the target and the environmental context and improves target detection accuracy.

However, the introduction of multiple sensors also creates an additional difficult problem, i.e., the problem of integrating multi-modal information. When it comes to integrating multi-sensor information, a target detection system may face challenges of data fusion, synchronization, and calibration. It is a complex problem that ensures the effective integration of multimodal data to improve target detection performance.

In summary, in order to solve the problems of poor robustness of the existing target detection methods in light conditions and the difficulty of integrating multimodal information, a method for target detection based on a visible camera, an infrared camera, and a LiDAR is provided, aiming to fully utilize advantages of the three sensors to improve the accuracy and robustness of target detection.

SUMMARY

In response to the deficiencies of the prior art, one or more embodiments of the present disclosure provide a method for target detection based on a visible camera, an infrared camera, and a LiDAR.

The method includes the following operation.

An infrared image, a visible light image, and a LiDAR point cloud are obtained by performing time synchronization and data preprocessing based on multi-sensor data acquired by the vehicle platform.

A depth map is obtained by using a depth prediction module based on the infrared image and the visible light image.

An input pseudo-point cloud is generated based on a depth map and spatial geometric relationships, and an aggregated point cloud is obtained by aggregating the input pseudo-point cloud with the LiDAR point cloud in a Euclidean space.

A multi-source feature is extracted using a backbone network based on the aggregated point cloud.

A fusion feature is generated by aggregating the multi-source feature.

A detection result of a target is output based on the fusion feature.

BRIEF DESCRIPTION OF THE DRAWINGS

The present disclosure is further illustrated in terms of exemplary embodiments. These exemplary embodiments are described in detail with reference to according to the drawings. These embodiments are non-limiting exemplary embodiments, in which like reference numerals represent similar structures, and wherein.

DETAILED DESCRIPTION

Figure 1:
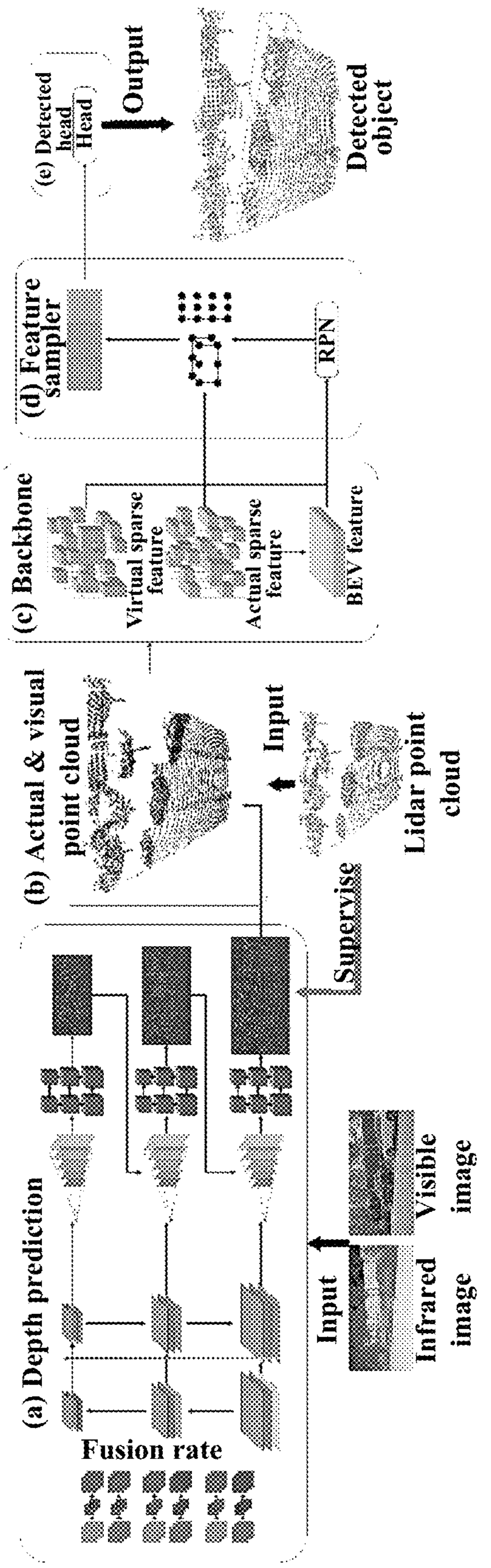
FIG. 1 is a schematic diagram illustrating an exemplary neural network of a method for target detection based on a visible camera, an infrared camera, and a LiDAR according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is a schematic diagram illustrating an exemplary neural network of a method for target detection based on a visible camera, an infrared camera, and a LiDAR according to some embodiments of the present disclosure.

Figure 2:
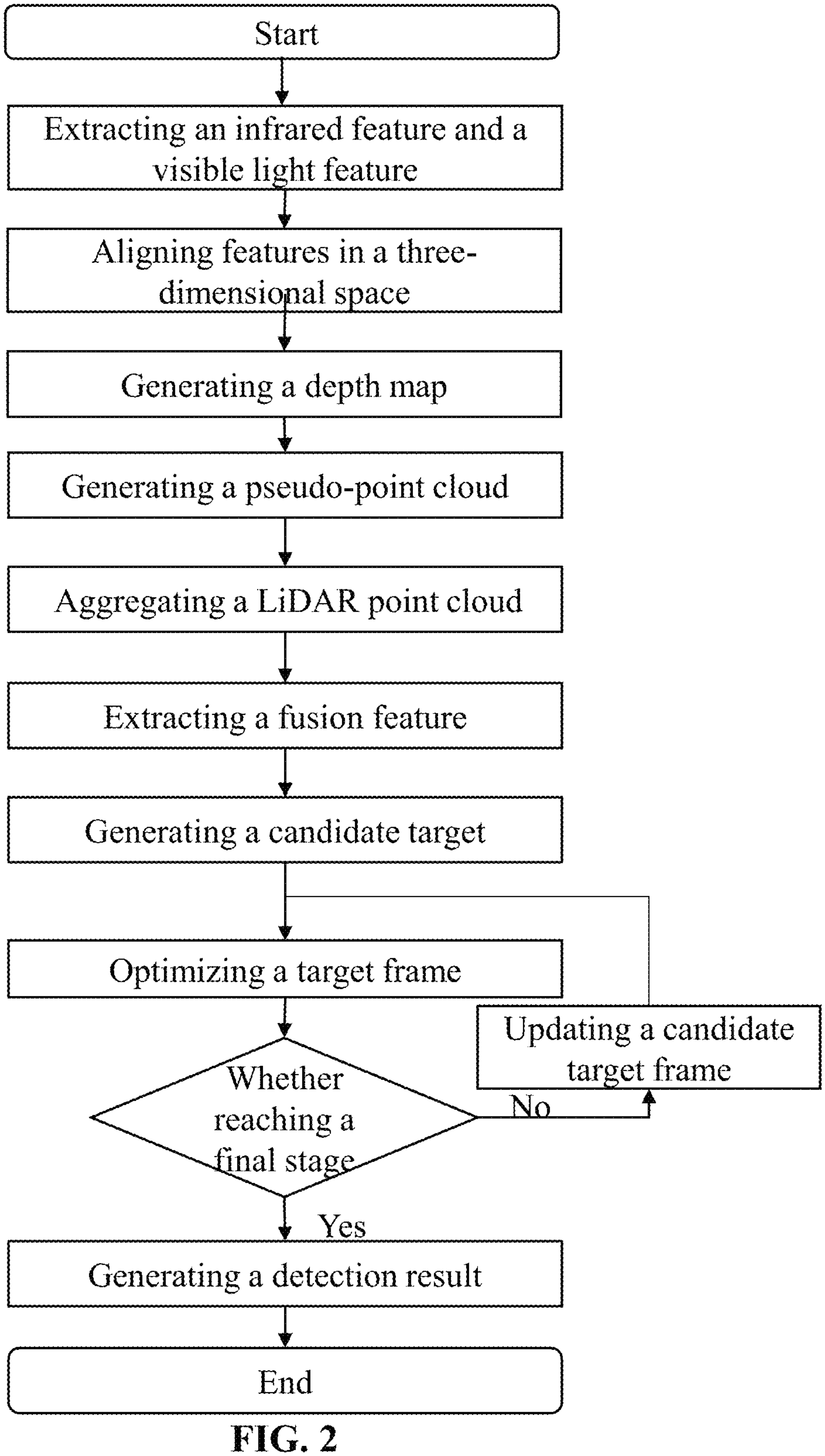
FIG. 2 is an exemplary flowchart illustrating a method for target detection based on a visible camera, an infrared camera, and a LIDAR according to some embodiments of the present disclosure.

FIG. 2 is an exemplary flowchart illustrating a method for target detection based on a visible camera, an infrared camera, and a LiDAR according to some embodiments of the present disclosure. In some embodiments, the method for target detection based on the visible camera, the infrared camera, and the LiDAR may be executed by a processor of an vehicle platform. In some embodiments, the method for target detection based on the visible camera, the infrared camera, and the LiDAR may include the following steps S1-S6. In S1, an infrared image, a visible light image, and a LiDAR point cloud are obtained by performing time synchronization and data preprocessing based on multi-sensor data acquired by the vehicle platform.

In some embodiments, the vehicle platform may be a platform for controlling the operation of a self-driving vehicle.

In some embodiments, the vehicle platform may include a processor, an infrared camera, a visible camera, and a LiDAR, etc. The infrared camera, the visible camera, the LiDAR, and the processor are electrically connected. The infrared camera, the visible camera, and the LiDAR may be mounted on top of the self-driving vehicle, and the processor may be mounted on the self-driving vehicle or not mounted on the self-driving vehicle.

The multi-sensor data refers to the various sensor data related to a scene collected by the vehicle platform. The scene may be the external environment where the self-driving vehicle is located. The scene may include one or more targets.

The target is an object to be detected. For example, a target may include a person, a car, etc., on the road that may have an impact on the movement of the vehicle.

In some embodiments, the multi-sensor data may include an uncorrected visible light image and its timestamp, an uncorrected infrared image and its timestamp, a LiDAR packet, or the like.

The time synchronization refers to keeping the time of each device consistent in a distributed vehicle platform by use of network technology. Each device may include an infrared camera, a visible camera, a LiDAR, etc. The processor of the vehicle platform may realize time synchronization through a variety of techniques. For example, the vehicle platform may achieve time synchronization of the various devices in the vehicle platform throughpulse per second (PPS) time synchronization technology.

The data preprocessing may include image correction, LiDAR point cloud generation, multi-sensor data alignment, etc.

The infrared image is an image formed by an infrared camera acquiring the radiation of each target in the scene in an infrared band. The infrared image may reflect the heat distribution of each target object in the scene.

In some embodiments, the infrared camera is used to acquire radiation data of each target in the scene in the infrared band, perform time synchronization and data preprocessing, and obtain the infrared image.

The visible light image is an image acquired by the visible camera that acquires a reflected light in a visible light band from each target in the scene. The visible light image is an image that provides high resolution and true color.

In some embodiments, the visible camera may collect the reflected light in the visible light band from each target in the scene, perform time synchronization and data preprocessing, and obtain the visible light image.

The LiDAR point cloud is a collection of spatial points obtained by scanning each target in the scene by the LiDAR.

In some embodiments, the LiDAR may scan each target in the scene to obtain a LiDAR data packet, perform time synchronization and data preprocessing to obtain the LiDAR point cloud.

In S2, a depth map is obtained by using a depth prediction module based on the infrared image and the visible light image.

In some embodiments, the depth prediction module may be a neural network. Merely by way of example, the structure of the neural network may be a neural network structure as shown in part (a) of FIG. 1.

The depth map is a two-dimensional image that stores depth values of all pixels in the infrared image or the visible light image. Each position in the depth map stores the depth value of the pixel at that position. The depth value is a value of a distance from the camera to each pixel point on the depth map.

Merely by way of example, a specific implementation manner for the processor to obtain depth features based on the infrared image and the visible light image using the depth prediction module, may be realized in S2.1-S2.3 as follows.

In S2.1, an infrared feature and a visible light feature are extracted by using a convolutional layer of a multilayered pyramid structure and a shared channel based on the infrared image and the visible light image.

The infrared feature is a feature associated with the infrared image. In some embodiments, the infrared feature may include an infrared radiation intensity value of each pixel in the infrared image and a value of each pixel in the infrared image after being transformed by the convolutional layer.

The visible light feature is a feature associated with the visible light image. In some embodiments, the visible light feature may include a visible light radiation intensity value of each pixel in the visible light image and a value of each pixel in the visible light image after being transformed by the convolutional layer.

In S2.2, the infrared feature and visible light feature are aligned in a three-dimensional space.

In some embodiments, the processor may obtain the three-dimensional space by modeling based on a multi-view camera model.

In some embodiments, the processor may align the infrared feature and the visible light feature at the same location point in the same scene in the three-dimensional space.

In S2.3, the depth map of the scene is obtained by performing depth prediction based on the aligned infrared feature and the aligned visible light feature.

In some embodiments, the processor may perform the depth prediction level by level based on the aligned infrared feature and the aligned visible light feature, the depth map of the scene is obtained. Level by level means predicting the depth of each location point in the same scene one by one.

Specifically, for each location point in the same scene, the processor may calculate a pixel difference between the infrared feature and the visible light feature of each location point one by one to obtain the depth of each location point in the scene, and thus obtain the depth map of the scene.

In S3, an input pseudo-point cloud is generated based on the spatial geometric relationship and aggregated with the LiDAR point cloud in a Euclidean space to obtain an aggregated point cloud based on the depth map, The aggregated point cloud is a point cloud formed by aggregating dispersed pseudo-point clouds and LiDAR point clouds together. Merely by way of example, a specific implementation of the processor generating the pseudo-point cloud based on a spatial geometric relationship based on the depth feature and obtaining the aggregated point cloud by aggregating with the LiDAR point cloud in the Euclidean space may be realized in S3.1-S3.8 as follows, and the implementation may be realized using the neural network in part (b) of FIG. 1.

In S3.1, a projection matrix of the infrared camera is determined based on the inner reference matrix and the outer reference matrix of the infrared camera.

Merely by way of example, the processor may employ a first algorithm to determine the projection matrix of the infrared camera as follows.

$$\text{Project}_{infrared} = \text{Intrinsic}_{infrared} \cdot \text{Extrinisic}_{infrared}$$

Where $\text{Project}_{infrared}$ denotes the projection matrix of the infrared camera, and $\text{Intrinsic}_{infrared}$ and $\text{Extrinsic}_{infrared}$ denote the inner reference matrix and the outer reference matrix of the infrared camera.

In S3.2, a three-dimensional coordinate of the input pseudo-point cloud is determined based on the projection matrix of the infrared camera.

The three-dimensional coordinate may be used to represent points in space using points with some significance composed of three variables independent of each other (e.g., variables on the X-axis, Y-axis, and Z-axis).

Merely by way of example, the processor may employ a second algorithm to determine the three-dimensional coordinates of the input pseudo-point cloud.

$$\begin{bmatrix} X_{virtual}(v, u)) \\ Y_{virtual}(v, u)) \\ Z_{virtual}(v, u)) \\ 1 \end{bmatrix} = \left(\text{Project}_{infrared}\right)^{-1} \cdot \begin{bmatrix} u \times D(v, u) \\ v \times D(v, u) \\ D(v, u) \\ 1 \end{bmatrix}$$

Where u and v denote indexes, D(v,u) denotes the depth value at the infrared pixel (v,u), $X_{virtual}$, $Y_{virtual}$, and $Z_{virtual}$ denote coordinates on the X-axis, Y-axis, and Z-axis of the input pseudo-point cloud, which together form the three-dimensional coordinate of the pseudo-point cloud, and $$\begin{bmatrix} u \times D(v, u) \\ v \times D(v, u) \\ D(v, u) \\ 1 \end{bmatrix}$$

denotes a generalized coordinate representation under the pixel coordinate system in a camera principle, the matrix represents the X-axis, Y-axis, Z-axis, and 1-coordinate of each unit under the infrared pixel coordinate system sequentially from top to bottom.

In S3.3, an infrared UV pixel coordinate of the pseudo point cloud is generated based on the infrared image.

The infrared UV pixel coordinate of the pseudo-point cloud may be used for subsequent extraction of infrared information of the pseudo-point cloud. The infrared information may include an infrared reflective intensity value of a single channel.

Merely by way of example, the processor may determine the infrared pixel coordinate of the input pseudo-point cloud using a third algorithm as follows, the third algorithm being a known pixel coordinate equation.

$$U_{infrared}(:, u) = u$$

$$V_{infrared}(v, :) = v$$

Where u and v denote indexes, $U_{infrared}$ (:,u) denotes a column coordinate of an infrared pixel when the column coordinate of the infrared pixel is u and a row coordinate of the infrared pixel is not limited, $V_{infrared}$(v,:) denotes the row coordinate of the infrared pixel when the row coordinate of the infrared pixel is v and the row coordinate of the infrared pixel is not limited, and $U_{infrared}$ and $V_{infrared}$ constitute the infrared UV pixel coordinate of the input pseudo-point cloud.

In S3.4, a projection matrix of the visible camera is determined based on the inner reference matrix and an outer reference matrix of the visible camera.

Merely by way of example, the processor may employ a fourth algorithm to determine the projection matrix for the visible camera.

$$\text{Project}_{visible} = \text{Intrinsic}_{visible} \cdot \text{Extrinisic}_{visible}$$

Where $\text{Project}_{visible}$ denotes the visible camera projection matrix, and $\text{Intrinsic}_{visible}$ and $\text{Extrinsic}_{visible}$ respectively denote the inner reference matrix and the outer reference matrix of the visible camera.

In S3.5, a visible UV pixel coordinate of the input pseudo-point cloud is determined based on the projection matrix of the visible camera.

The visible UV pixel coordinate of the input pseudo-point cloud may be used to subsequently extract visible light information of the pseudo-point cloud, which may include visible light reflection intensity values of three channels (e.g., red, green, and blue channels).

Merely by way of example, the processor may determine the visible UV pixel coordinate of the input pseudo-point cloud by employing a fifth algorithm as follows.

$$\begin{bmatrix} U_{visible}(v,u)\times D_{visible}(v,u) \\ V_{visible}(v,u)\times D_{visible}(v,u) \\ D_{visible}(v,u) \\ 1 \end{bmatrix} = \text{Project}_{visible}\cdot \begin{bmatrix} X_{virtual}(v,u)) \\ Y_{virtual}(v,u)) \\ Z_{virtual}(v,u)) \\ 1 \end{bmatrix}$$

Where u and v denote indexes, $U_{visible}$(v,u) denotes a column coordinate of a visible pixel, $V_{visible}$(v,u) denotes a row coordinate of the visible pixel, $D_{visible}$(v,u) denotes a depth of the visible pixel, and $X_{virtual}$, $Y_{virtual}$, and $Z_{virtual}$ denote three-dimensional coordinates of the input pseudo-point cloud. $U_{visible}$ and $V_{visible}$ together form the visible UV pixel coordinate of the input pseudo-point cloud.

In 3.6, an initial pseudo-point cloud is determined based on the three-dimensional coordinate, the infrared UV pixel coordinate, the visible UV pixel coordinates, the infrared image, and the visible light image of the input pseudo-point cloud.

The initial pseudo-point cloud is a pseudo-point cloud of an initial state.

Merely by way of example, the processor may determine an initial pseudo-point cloud by using a sixth algorithm as follows.

$$P_{virtual}(0,:,:) = X_{virtual}$$
$$P_{virtual}(1,:,:) = Y_{virtual}$$
$$P_{virtual}(2,:,:) = Z_{virtual}$$
$$P_{virtual}(3,v,u) = I_{infrared}(0, V_{infrared}(v,u), U_{infrared}(v,u))$$
$$P_{virtual}(4,v,u) = I_{visible}(0, V_{visible}(v,u), U_{visible}(v,u))$$
$$P_{virtual}(5,v,u) = I_{visible}(1, V_{visible}(v,u), U_{visible}(v,u))$$
$$P_{virtual}(6,v,u) = I_{visible}(2, V_{visible}(v,u), U_{visible}(v,u))$$

Where u and v denote indexes, $P_{virtual}$ denotes the initial pseudo-point cloud, $P_{virtual}$(0,:,:), $P_{virtual}$(2,:,:), $P_{virtual}$(3,v, u), $P_{virtual}$(4, v, u), $P_{virtual}$(5, v,u), and $P_{virtual}$(6,v,u) denote features of channels which make up the initial pseudo-point cloud, $P_{virtual}$(0,:,:) denotes a channel characteristic of a point on the initial pseudo-point cloud when the X-coordinate of the point is 0 and neither the Y-coordinate nor the Z-coordinate is limited; $P_{virtual}$(2,:,:), $P_{virtual}$(3,v,u), $P_{virtual}$(4,v,u), $P_{virtual}$(5,v,u), and $P_{virtual}$(6,v,u) are similar to $P_{virtual}$(0,:,:); Iinfrared denotes the infrared image, and $I_{visible}$ denotes the visible light image. The channel characteristic may include a count of channels on a convolutional layer corresponding to at least one point on the initial pseudo-point cloud.

In S3.7, the input pseudo-point cloud is determined by disordering the initial pseudo-point cloud and filtering out outlier points in the initial pseudo-point cloud based on a range constraint.

The operation of disordering means to disrupt the order of the points on the initial pseudo-point cloud. Disordering the initial pseudo-point cloud increases the randomness of the input initial pseudo-point cloud and reduces the probability of overfitting phenomenon in subsequent training of the neural network.

The outlier points are points in the pseudo-point cloud that deviate from the majority of the point cloud. The outlier points in the pseudo-point cloud may cause errors when calculating a graph boundary. However, filtering too many outlier points in the pseudo-point cloud may result in a small recognition of the target boundary, leading to errors in autonomous driving obstacle avoidance and causing a collision risk.

The range constraint may be used to distinguish the outlier points in the pseudo-point cloud. The range constraint may include a threshold value. The threshold value is a critical value for a straight line distance between any point in the pseudo-point cloud and a point at the median of the pseudo-point cloud. In some embodiments, the threshold value may be predetermined empirically for one of skills in the art.

The processor may distinguish the outlier points in the pseudo-point cloud by the threshold value. For example, in response to the straight-line distance between any point in the pseudo-point cloud and the point at the median of the pseudo-point cloud greater than the threshold value, the processor may determine the point to be the outlier point. The processor may compute the straight line distance between the point in the pseudo-point cloud and the point at the median of the pseudo-point cloud using a Euclidean distance.

The input pseudo-point cloud is a pseudo-point cloud used as input to the neural network for processing.

In S3.8, the LiDAR point cloud and the input pseudo-point cloud are aggregated in the Euclidean space to obtain the aggregated point cloud.

In some embodiments, the aggregation may be implemented by aligning and supplementing input pseudo-point clouds and LiDAR point clouds with different dimensional features to a specific dimensional feature, and then aggregating them together, to obtain an aggregated point cloud.

The dimensional features may include an X coordinate, a Y coordinate, a Z coordinate, an infrared reflective intensity, a red reflective intensity, a green reflective intensity, a blue reflective intensity, a point category, etc., of the point. The point category may include a true point and a pseudo point. The true point is a point on the LiDAR point cloud. The pseudo point is a point on the input pseudo-point cloud. The true point may be represented by 0, and the pseudo point may be represented by 1.

Specific dimensional features may be set for a person skilled in the art based on experience, e.g., 8 dimensional features.

In some embodiments, the input pseudo-point cloud may be a set of points including 7 dimensional features. Each point on the input pseudo-point cloud may be represented as a vector including 7 dimensional features. For example, each point on the input pseudo-point cloud may be represented as a first vector (the X coordinate, the Y coordinate, the Z coordinate, the infrared reflective intensity, the red reflective intensity, the green reflective intensity, and the blue reflective intensity).

In some embodiments, the LiDAR point cloud may be a set of points including 4 dimensional features. Each point on the LiDAR point cloud may be represented as a vector including 4 dimensional features. For example, each point on the LiDAR point cloud may be represented as a second vector (the X coordinate, the Y coordinate, the Z coordinate, and the LiDAR reflective intensity).

The aggregated point cloud may be a set of points including 8 dimensional features. Each point on the aggregated point cloud may be represented as a vector including 8 dimensional features. For example, each point on the aggregated point cloud may be represented as a third vector (the X coordinate, the Y coordinate, the Z coordinate, the LiDAR reflective intensity, the inferred reflective intensity, the red reflective intensity, the green reflective intensity, the blue reflective intensity, and the point category).

In some embodiments, the processor may take a set of points including 4 dimensional features or a set of points including 7 dimensional features to obtain a set of points including 8 dimensional features by supplementing vacant dimensional features with 0.

In S4, for the aggregated point cloud, a multi-source feature is extracted by using the backbone network.

The backbone network may be the neural network in part (c) of FIG. 1.

The multi-source feature is a feature from a plurality of different sources. In some embodiments, the multi-source feature may include a true point cloud feature, a pseudo-point cloud feature, an aerial view feature, etc.

The true point cloud feature is feature information extracted from a voxelized aggregated point cloud where the category of points is true.

The pseudo point cloud feature is feature information extracted from the voxelized aggregated point cloud where the category of points is pseudo.

In some embodiments, the true point cloud feature and the pseudo-point cloud feature may include geometric features, texture features, semantic features, or the like, at different scales.

The aerial view feature is a planar feature extracted from an aerial view.

Merely by way of example, a specific implementation of the processor extracting the multi-source feature by using the backbone network may be achieved in S4.1-S4.4 as follows. In S4.1, the aggregated point cloud is voxelized.

Being voxelized refers to a process of simulating a geometry of a point cloud using a voxel grid of a uniform spatial size.

In some embodiments, the processor may employ a plurality of manners (e.g., employing the spconv open source library, etc.) to voxelize the aggregated point cloud.

In S4.2, a true point cloud feature and a pseudo point cloud feature of the voxelized aggregated point cloud are extracted using a sparse convolution, respectively.

The sparse convolution may efficiently perform three-dimensional convolution operations on sparse voxelized aggregated point clouds to extract point cloud features.

In S4.3, the true point cloud feature is compressed in the three-dimensional space along a height axis direction to obtain the initial aerial view feature.

A height axis may be a vertical axis in the three-dimensional space.

The initial aerial view feature is an aerial view feature that has not been processed by a traditional convolution. The traditional convolution may be a two-dimensional convolution.

In S4.4, a final aerial view feature is obtained by further extracting the features using the traditional convolution based on the initial aerial view features.

In S5, a fusion feature is generated by aggregating the multi-source feature.

The fusion feature is a feature merged by a plurality of features. The fusion feature may have a higher correlation than a plurality of input features.

In some embodiments, the processor may employ a plurality of manners (e.g., a series feature fusion manner, a deep feature fusion manner, etc.) to aggregate the multi-source feature to generate the fusion feature.

Merely by way of example, a specific implementation of the processor aggregating the multi-source feature to generate the fusion feature may be realized in S5.1-S5.2 as follows, which may be realized by the neural network as shown in part (d) in FIG. 1.

In S5.1, a candidate target frame is generated using a region generating network based on the multi-source feature.

The region generating network may be used to extract the candidate target frame.

The candidate target frame is a target frame to be selected. The target frame may be used to describe the category, location, size, and orientation of the target. The target frame may be a three-dimensional cube box.

In S5.2, a fusion feature of the candidate target region is obtained by performing a pooling operation on the multi-source feature based on the candidate target frame.

The pooling operation may be understood as an operation of sampling the multi-source feature performed on the candidate target frame.

The fusion feature enables complementarity between different features, integrating the advantages of different features.

In S6, a detection result of the target is output based on the fusion feature.

The detection result may include information about the category, location, size, and orientation of the target.

In some embodiments, the processor may employ a Cascade RCNN detection header based on the fusion feature to optimize the detection result of an output target step by step.

Merely by way of example, the implementation of the processor outputting the detection result of the target based on the fusion feature may be realized in S6.1-S6.3 as follows, and the implementation may be realized in a neural network as in part (c) of FIG. 1.

In S6.1, the target frame of a current stage is obtained by optimizing the candidate target frame based on a classification module and a regression module.

The classification module may discriminate between the categories of a plurality of targets in the scene.

The regression module may be used to regress position, size, and orientation information for the plurality of targets in the scene.

In S6.2, the candidate target frame is iteratively updated based on the target frame of the current stage and the fusion feature corresponding to the target frame of the current stage.

Each iteration includes optimizing and updating the target frame of the current stage to be updated and the fusion feature corresponding to the target frame of the current stage to be updated based on the Cascade RCNN detection header to output an updated candidate target frame.

The iteration refers to a process of iteratively updating the target frame of the current stage to be updated through a plurality of rounds and eventually determining the target frame of the final current stage.

In the first round of iteration, the target frame of the current stage to be updated may be a candidate target frame optimized by the classification module and the regression module. In subsequent rounds of iteration, the target frame of the current stage to be updated may be an updated candidate target frame based on the updated target frame obtained from the previous round of iteration.

The condition for the end of the iteration may be that a count of iterations reaches a threshold.

In S6.3, in response to the current stage corresponding to the last round of iteration, the target frame of the current stage is designated as the detection result.

In some embodiments of the present disclosure, the visible light image, the infrared image, and the LiDAR point cloud are used as inputs, and the depth map is first generated using the visible light image and the infrared image. The pseudo-point cloud is then generated using an inverse projection manner. The pseudo-point cloud carries the visible light feature and the infrared feature and is in the same coordinate system as the LiDAR point cloud, so that the alignment of multimodal information and the extraction of the fusion feature in the three-dimensional space may be realized based on the spatial geometric relationship. Finally, the cascade strategy is used to optimize the candidate target frame step by step and output the target detection result at the last stage, which improves the accuracy and robustness of the target detection and realizes the multi-category target detection in the vehicle road scene.

Figure 5:
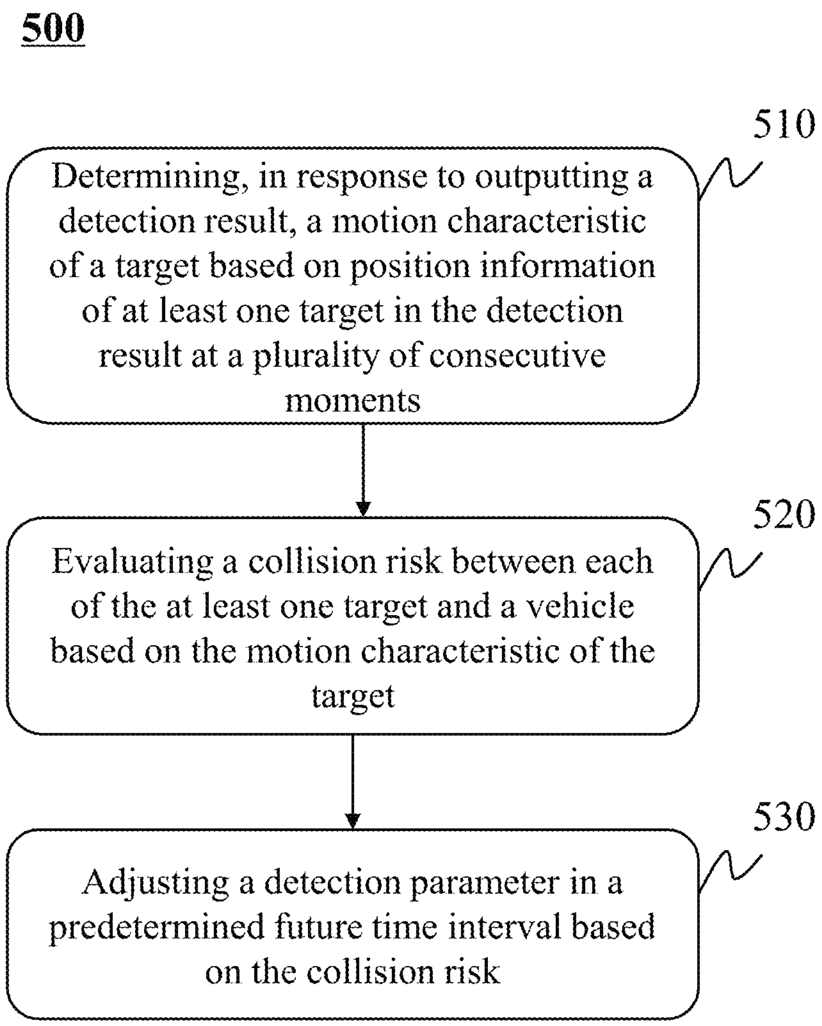
FIG. 5 is an exemplary flowchart illustrating an exemplary process of adjusting a detection parameter in a predetermined future time interval according to some embodiments of the present disclosure.

In some embodiments, the method for target detection based on the visible camera, the infrared camera, and the LiDAR may further include steps 510-520, as described in FIG. 5.

In some embodiments, the method for target detection based on the visible camera, the infrared camera, and the LiDAR may further include steps 610-620 as follows.

In 610, in an actual scene, the target and a sample infrared image, a sample visible light image, and a sample LiDAR point cloud corresponding to the target are collected based on a predetermined ratio to construct a training dataset.

The predetermined ratio refers to a pre-set ratio of a count of different types of first training samples. A first training sample may include the target and the sample infrared image, the sample visible light image, and the sample LiDAR point cloud corresponding to the target. In some embodiments, the processor may categorize the first training sample into different types based on a difference in a distance between the target and a vehicle in the first training sample. Collecting the training dataset according to the predetermined ratio may ensure the diversity of the training dataset.

In some embodiments, the predetermined ratio may include a proportion of each target that has a different distance from the vehicle.

In some embodiments, the processor may uniformly set a proportion of first training samples corresponding to different target distances.

In some embodiments, the processor may also obtain a historical target monitoring record of the vehicle, and designate a ratio of a frequency of occurrence of different historical target distances in the historical target monitoring record of the vehicle as the predetermined ratio.

In some embodiments, the processor may divide different historical target distances in advance into a plurality of predetermined intervals, and count the frequency of occurrence of the historical target distances in each of the plurality of predetermined intervals in the historical target monitoring record of the vehicle to determine a ratio of a frequency of occurrence of different historical target distances. For example, the processor may divide the different historical target distances into a plurality of preset intervals in advance, i.e., 0 meters to 10 meters, 10 meters to 20 meters, 20 meters to 30 meters, etc. The processor may count, in the historical target monitoring record of the vehicle, the frequency of occurrence of the historical target distance in each preset interval, to determine the ratio of the frequency of occurrence of different historical target distances.

By taking the ratio of the frequency of occurrence of different historical target distances in the historical target monitoring record of the vehicle as the predetermined ratio, the training dataset may include more historical target distances frequently encountered during the actual driving of the vehicle, so that the neural network obtained for outputting the detection result of the target may be more in line with the actual needs of the current vehicle.

The actual scene may be an actual scene where the vehicle is driving autonomously.

The training dataset refers to a dataset that is used to train the neural network that is used to output the detection result of the target. The neural network may be a known neural network as shown in FIG. 1. In some embodiments, the training dataset may include a plurality of first training samples.

In 610, a learning rate corresponding to different first training samples of the same training dataset is determined during a training process of the neural network based on a size of the target and the target distance in the training dataset.

The training process of the neural network may be a training process of the known neural network as referred to in FIG. 1.

The size of the target may be a volume of the target.

The target distance refers to a distance between the target and the vehicle.

In some embodiments, the processor may obtain the target distance and the size of the target via the LiDAR on the vehicle.

The learning rate refers to a step size at which the weights are updated at each iteration during the training process of the neural network. The learning rate determines an amplitude of each weight updated in a gradient direction. A suitable learning rate allows the neural network to converge quickly to obtain an optimal solution.

In some embodiments, the learning rate of the neural network may be a fixed learning rate, which may then gradually change as the network is iteratively trained a plurality of times.

In some embodiments, the learning rate of the neural network is also correlated to the size and target distance of the target of the first training sample used each time the neural network is trained.

In some embodiments, the processor may determine the learning rate corresponding to different first training samples of the same training dataset based on the size of the target and the target distance of the target in the training dataset using a preset comparison table.

Correspondences exist in the preset comparison table between a size of a reference target and a learning rate corresponding to the reference first training sample and between a reference target distance and the learning rate corresponding to the reference first training sample. The size of the reference target and the reference target distance correspond to the reference first training sample. The preset comparison may be constructed based on prior knowledge or historical data.

In some embodiments, the processor may also determine the learning rate corresponding to different first training samples of the same training dataset during the training process of the neural network based on sizes of different targets in the training dataset and a collision risk corresponding to the target distance in the historical data.

The historical data may include the first training sample and other historical target monitoring data that are not designated as the first training sample.

Descriptions regarding the definition of the collision risk and obtaining the collision risk may be found in FIG. 5 and related descriptions thereof.

In some embodiments, the processor may determine the learning rate corresponding to different first training samples in the same training dataset by S111-S113 as follows.

In S111, a plurality of first training samples in the training dataset are classified according to the size of the target and the target distance.

In some embodiments, the processor may count a first interval range corresponding to all the target distances in the training dataset, and divide the first interval range according to a first division manner, into a plurality of first subinterval ranges. The first division manner may be any feasible division manner, such as an equal interval range division manner, etc.

In some embodiments, the processor may count a second interval range corresponding to the size of all the targets in the training dataset, and divide the second interval range according to the second division manner, into a plurality of second subinterval ranges. The second division manner may be any feasible division manner, such as an equal interval range division manner.

For example, if the processor statistically counts that the size of all the targets in the training dataset corresponds to a second interval range of 0-5 $m^3$, a plurality of second subintervals obtained from the division of the second interval range may be divided into a plurality of different second intervals as follows: the size of the target is less than 1 $m^3$, the size of the target less than a range of 1 $m^3$ to 3 $m^3$, the size of the target is less than a range of 3 $m^3$ to 5 $m^3$, etc.

In some embodiments, for each first training sample in the training dataset, the processor may classify the first training sample based on a second subinterval range to which the size of the target of the first training sample belongs and a first subinterval range to which the target distance belongs. For example, classification 1 (the size of the target is less than 1 $m^3$; the target distance is within a range of 0 m to 10 m); classification 2 (the size of the target is less than a range of 1 $m^3$ to 3 $m^3$; target distance is within a range of 10 m to 20 m) . . . .

In S112, a mean value of the collision risk between each target and the vehicle in at least one first training sample under each of the different classifications in the historical data is counted. The historical data is documented with a value corresponding to the collision risk between each target and the vehicle in all the first training samples. The value corresponding to the collision risk between the target and the vehicle may be 1 or 0. 1 means that there has been a collision between the target and the vehicle in history, and 0 means that there has not been a collision between the target and the vehicle in history.

In S113, based on the mean value of the collision risk between each target and the vehicle in at least one first training sample under each of the different classifications, a learning rate corresponding to the first training sample of the corresponding classification during the training process of the neural network is set.

In some embodiments, the larger the mean value, the higher the learning rate of the neural network may be preset.

For example, a person skilled in the art may preset a one-to-one correspondence between a plurality of learning rates of different values and a mean value of a plurality of collision risks, and assign the learning rate to the first training samples of the corresponding classification according to the mean value of the collision risk corresponding to the first training sample.

In some embodiments of the present disclosure, the learning rate of the neural network for outputting the detection result of the target is set according to the size of the target and the target distance in the training dataset. Moreover, the learning rate of the neural network is updated mainly according to the target having a large impact on the automated driving of the vehicle, so that the learning rate of the neural network is more in line with the actual needs of automatic driving.

Figure 3:
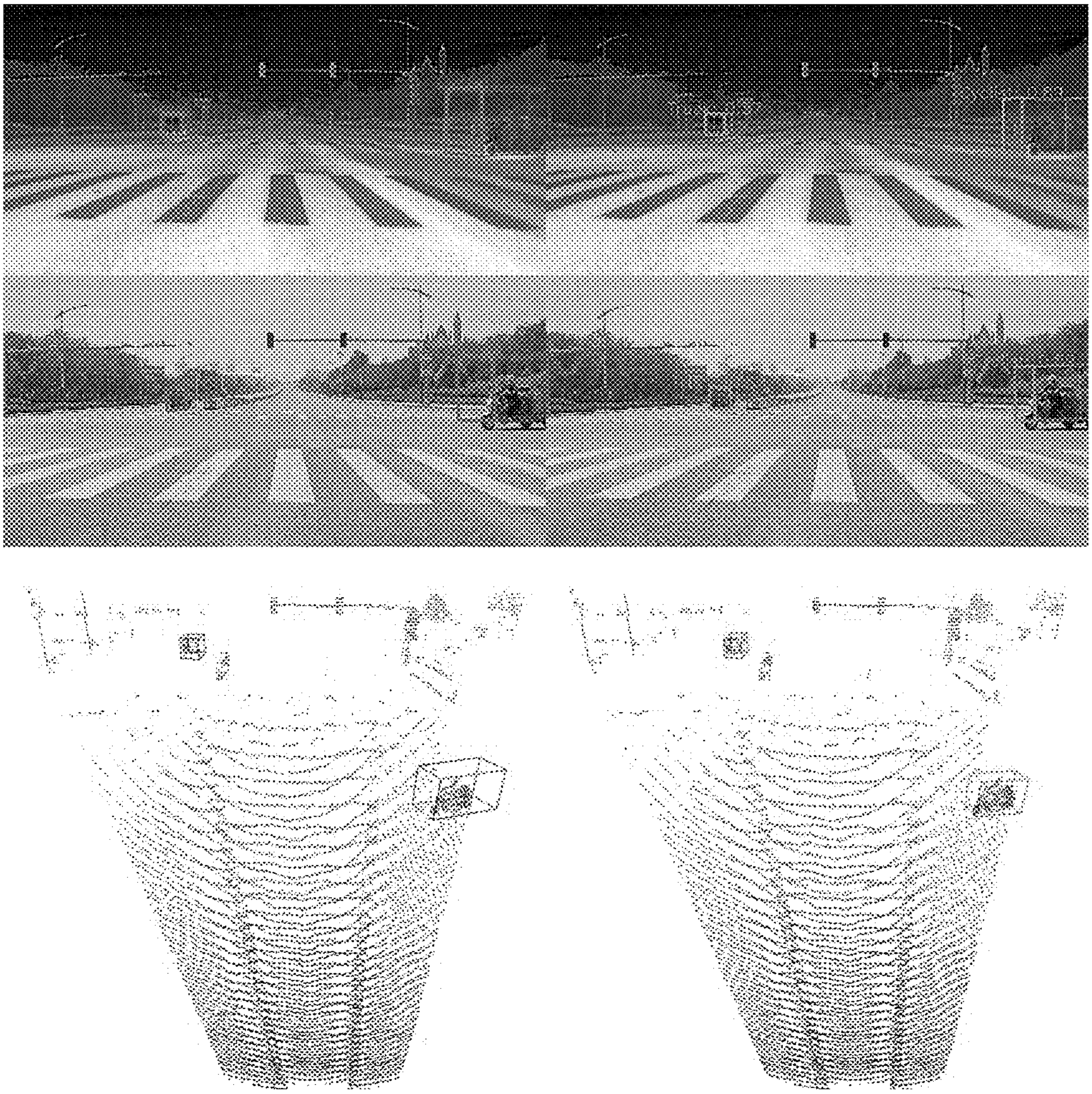
FIG. 3 is a schematic diagram illustrating an effect of depth prediction in a sparse scene according to some embodiments of the present disclosure.

FIG. 3 is a schematic diagram illustrating an effect of depth prediction in a sparse scene according to some embodiments of the present disclosure.

As shown in FIG. 3, the first row is infrared images, the second row is visible light images, and the third row is LiDAR point cloud. Target frames in the left column are real values, and target frames in the right column are predicted values. All the targets in the scene may be accurately identified and located, which verifies the effectiveness of the target sparse scene.

Figure 4:
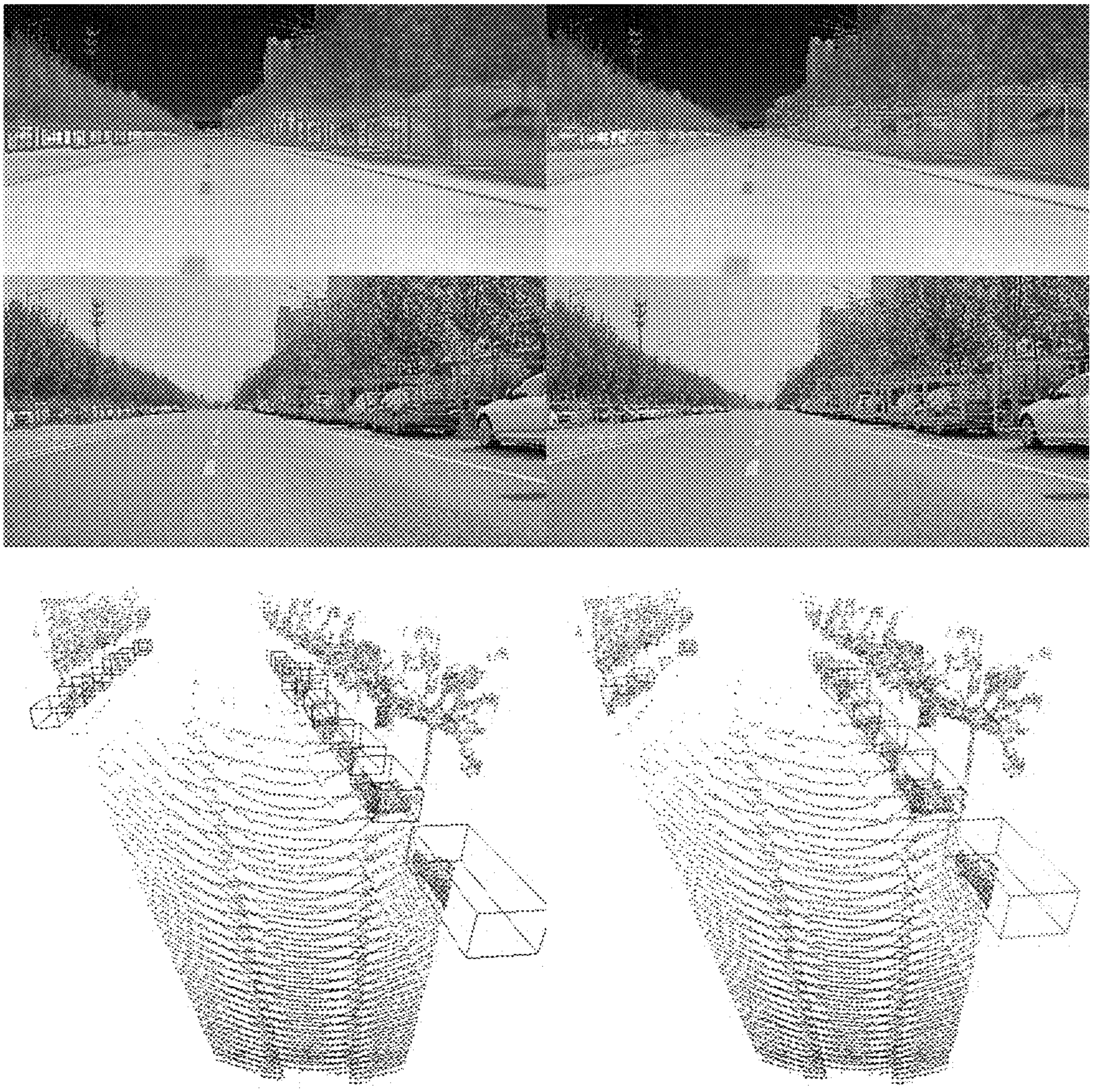
FIG. 4 is a schematic diagram illustrating an effect of depth prediction in a dense scene according to some embodiments of the present disclosure.

FIG. 4 is a schematic diagram illustrating an effect of depth prediction in a dense scene according to some embodiments of the present disclosure.

As shown in FIG. 4, the first row is infrared images, the second row is visible light images, and the third row is LiDAR point cloud. Target frames in the left column are the real values, and target frames in the right column are the predicted values. Most of the targets in the scene may be accurately identified and located, which verifies the effectiveness of the target dense scene.

FIG. 5 is an exemplary flowchart illustrating an exemplary process of adjusting a detection parameter in a predetermined future time interval according to some embodiments of the present disclosure. In some embodiments, process 500 may be executed by a processor of an vehicle platform. As shown in FIG. 5, the process 500 includes steps 510-530 as follows.

Step 510, in response to outputting a detection result, a motion characteristic of a target is determined based on position information of at least one target in the detection result at a plurality of consecutive moments.

Descriptions regarding the detection result and the target may be found in FIG. 2 and related descriptions thereof.

The position information refers to information about coordinates of a position of the target in space.

The motor characteristic refers to a characteristic relates to the motion of the target.

In some embodiments, the motion characteristic may include at least one of a velocity, an acceleration, a direction, a trajectory, or the like, of the motion of the target in space.

In some embodiments, for each of the at least one target, the processor may connect the position information of the target at the plurality of moments to obtain the trajectory of the target and the direction of the motion. The processor may also calculate a corresponding velocity based on the position information and a time difference of the target at any two adjacent moments. The processor may also calculate the acceleration, or the like, based on a plurality of velocities.

In 520, a collision risk between each of the at least one target and the vehicle is evaluated based on the motion characteristic of the target.

The collision risk refers to a probability of a collision between the target and the vehicle. The collision risk may be expressed as any number from 0-1. The closer the value of collision risk is to 1, the more likely a collision is to occur between the target and the vehicle.

In some embodiments, for each of the at least one target and the vehicle, the processor may, in response to the trajectory of the target showing that the target is getting closer to the vehicle or the target is approaching the vehicle at an increasing velocity, determine that the greater the collision risk.

Merely by way of example, the processor may calculate the collision risk between the target and the vehicle based on the velocity at which the target approaches the vehicle based on a predetermined rule.

The predetermined rule may be that the collision risk is 1-1/v when a velocity v of the target approaching the vehicle is greater than 0; the collision risk is 0 when the velocity v of the target approaching the vehicle is equal to or less than 0. When the velocity v of the target approaching the vehicle is less than 0, it means that the target is away from the vehicle.

In some embodiments, the processor may also evaluate the collision risk between each of the at least one target and the vehicle based on the motion characteristic of the target, a target distance, a size of the target, and an established driving parameter of the vehicle, via a collision model.

Descriptions regading the target distance and the size of the target may be found in S11 in FIG. 2.

The established driving parameter of the vehicle refers to a driving parameter of the vehicle during driving at a current moment. In some embodiments, the established driving parameter of the vehicle may include a driving speed, a driving path, a driving direction, or the like, of the vehicle at the current moment.

In some embodiments, the processor may obtain the established driving parameter of the vehicle via sensors on the vehicle.

In some embodiments, the collision model may be a machine learning model. For example, the collision model may be a Recurrent Neural Network (RNN) model.

In some embodiments, the collision model may be trained based on a plurality of second training samples with a second label.

The second training samples may include the motion characteristic of a second sample target, a target distance of the second sample target, a size of the second sample target, and an established driving parameter of the second sample vehicle. The second label may be a sample collision risk corresponding to the second training sample.

The second training sample may be manually predefined.

In some embodiments, the processor may designate manually preset motion characteristics of different second sample targets, the target distance of the second sample target, the size of the second sample target, and the established driving parameter of the second sample vehicle as the second training samples. Through an experimental scene simulation or software, a motion of the second sample target and a motion of the second sample vehicle in the second training sample are simulated. According to whether the second sample vehicle collides with the second sample target during the simulation process, it is determined whether the second sample vehicle collides with the second sample target. If the second sample vehicle collides with the second sample target, the label is 1. If the second sample vehicle do not collide with the second sample target, the label is 0.

In some embodiments, the processor may obtain a trained collision model through S810-S830 below.

In S810, a training dataset is obtained.

The training dataset includes the plurality of second training samples and the second label corresponding to each of the plurality of second training samples.

In S820, at least one round of iteration is executed, specifically including steps 1)-step 3) as follows. In step 1), at least one second training sample is selected from the training dataset, the at least one second training sample is input into the initial collision model, and an output of the initial collision model corresponding to the at least one second training sample is obtained. In step 2), the output of the initial collision model corresponding to the at least one second training sample, and the second label corresponding to that at least one second training sample, are substituted into an equation of a predefined loss function to calculate a value of a loss function.

The loss function may be preset empirically for those skilled in the art. In step 3), model parameters in the initial collision model are reversely updated based on the value of the loss function.

In some embodiments, the processor may use a plurality of algorithms to reversely update the model parameters in the initial collision model. For example, the processor may reversely update the model parameters in the initial collision model based on a gradient descent algorithm.

In 830, when an end condition of the iteration is satisfied, the iteration is ended and the trained collision model is obtained.

The end condition of the iteration may be that the loss function converges, a count of iterations reaches a threshold, etc.

In some embodiments of the present disclosure, the collision risk between the target and the vehicle may be rapidly and accurately predicted by the collision model.

In 530, a detection parameter in a predetermined future time interval is adjusted based on the collision risk.

The predetermined future time interval may be a time interval between the current moment and the future moment corresponding to the vehicle passing currently detected one or more targets.

The detection parameter refers to a parameter related to target detection.

In some embodiments, the detection parameter may include a range constraint. More descriptions regarding the range constraint may be found in step S3 in FIG. 2.

In some embodiments, the processor may adjust the range constraint within the predetermined future time interval based on the collision risk and a risk threshold.

Specifically, the processor may, in response to the collision risk being greater than the risk threshold, increase a threshold value in the range constraint based on a risk difference between the collision risk and the risk threshold, to reduce the filtering of outliers. The risk threshold refers to a critical value of the collision risk. The risk threshold may be predetermined empirically for those skilled in the art.

In some embodiments, the higher the risk difference, the greater the magnitude of the threshold value in the range constraint is adjusted upward. More descriptions regarding the threshold value may be found in S3 in FIG. 2.

Merely by way of example, a threshold value in an adjusted range constraint=a base threshold value+k1*risk difference, where k is a coefficient set based on a priori experience. The base threshold value may be preset based on experience for those skilled in the art.

In some embodiments, the detection parameter may also include a count of layers of a multi-layer pyramid. The count of layers of the multi-layer pyramid may reflect the accuracy of the convolutional layer, which is used to extract infrared features and visible light features. In some embodiments, the larger the count of layers of the multi-layer pyramid, the more accurate the convolutional layer is for extracting the infrared features and the visible light features.

In some embodiments, the processor may adjust the count of layers of the multi-layer pyramid in the predetermined future time interval based on the collision risk and the risk threshold. Specifically, the processor may increase, in response to the collision risk being greater than the risk threshold, the count of layers of the multi-layer pyramid based on a count of base layers of the multi-layer pyramid and the difference in risk between the collision risk and the risk threshold, to improve the accuracy of the detection of the convolutional layer and facilitate obstacle avoidance of the vehicle.

Merely by way of example, the count of layers of the multi-layer pyramid=the count of base layers of the multi-layer pyramid+ [k2*risk difference], where k2 is a coefficient, and [k2*risk difference] denotes rounding "k2*risk difference". The count of base layers of the multi-layer pyramid and k2 may be preset empirically for those skilled in the art.

In some embodiments, the processor may also pre-train to obtain neural networks of a plurality of pyramids with different counts of layers, select neural network corresponding to a count of layers of the multi-layer pyramid after adjustment in a future time interval, and predict the detection result of the target.

In some embodiments of the present disclosure, when the collision risk is greater than the risk threshold, by increasing the count of layers of the multi-layer pyramid based on the risk difference between the collision risk and the risk threshold on top of the count of base layers of the multi-layer pyramid and then selecting the pre-trained neural network corresponding to the count of layers of the increased multi-layer pyramid for prediction, the accuracy of the prediction of the convolutional layer may be increased, and then the accuracy of the target detection may be improved, which facilitates the obstacle avoidance of the vehicle.

In some embodiments of the present disclosure, in order to enable the vehicle to better avoid obstacles based on a detected target, the detection parameter in the predetermined future time interval is adjusted by evaluating the collision risk between each of the at least one target and the vehicle through the motion characteristic determined based on the position information of at least one target in the detection results of the plurality of consecutive moments. Thus, when the target is moving relatively fast and the collision risk is relatively high, the range constraint for filtering outliers is appropriately adjusted, to avoid more collision risk since targets on the road cannot be completely monitored by visible cameras, infrared cameras, and LiDAR due to light issues, interference source issues (e.g., interference sources that interfere with radar), etc. For example, a part of a point cloud of a target becomes sparse due to environmental interference, causing it to exceed a range limit and be filtered out. Therefore, it cannot be fully monitored by visible cameras, infrared cameras, and LiDAR, resulting in more collision risks.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for target detection based on a visible camera, an infrared camera, and a LiDAR, wherein the method is executed by a processor of a vehicle platform, comprising:

obtaining an infrared image, a visible light image, and a LiDAR point cloud by performing time synchronization and data preprocessing based on multi-sensor data acquired by the vehicle platform;

obtaining a depth map of a scene by using a depth prediction module based on the infrared image and the visible light image;

generating an input pseudo-point cloud based on the depth map and spatial geometric relationships, and obtaining an aggregated point cloud by aggregating the input pseudo-point cloud with the LiDAR point cloud in a Euclidean space;

for the aggregated point cloud, extracting a multi-source feature using a backbone network;

generating a fusion feature by aggregating the multi-source feature, including:

generating a candidate target frame using a region generating network based on the multi-source feature; and obtaining a fusion feature of the candidate target frame by performing a pooling operation on the multi-source feature based on the candidate target frame; and outputting a detection result of a target based on the fusion feature, including:

obtaining a target frame of a current stage by optimizing the candidate target frame based on a classification module and a regression module;

iteratively updating the candidate target frame based on the target frame of the current stage and the fusion feature corresponding to the target frame of the current stage, wherein each iteration includes optimizing and updating a target frame of a current stage to be updated and the fusion feature corresponding to the target frame of the current stage to be updated based on a Cascade RCNN detection header to output an updated candidate target frame; and in response to the current stage corresponding to a last round of iterations, designating the target frame of the current stage as the detection result.

2. The method of claim 1, wherein the depth prediction module includes a convolutional layer of a multilayered pyramid structure and a shared channel, and the obtaining a depth map of a scene by using a depth prediction module based on the infrared image and the visible light image includes:

extracting an infrared feature and a visible light feature by using the convolutional layer of the multilayered pyramid structure and the shared channel based on the infrared image and the visible light image;

aligning the infrared feature and the visible light feature in a three-dimensional space; and obtaining the depth map of the scene by performing depth prediction based on the aligned infrared feature and the aligned visible light feature.

3. The method of claim 2, wherein the three-dimensional space is obtained by modeling based on a multi-view camera model.

4. The method of claim 1, wherein the generating an input pseudo-point cloud based on the depth map and spatial geometric relationships, and obtaining an aggregated point cloud by aggregating the input pseudo-point cloud with the LiDAR point cloud in Euclidean space includes:

determining a projection matrix of the infrared camera based on an inner reference matrix and an outer reference matrix of the infrared camera;

determining three-dimensional coordinates of the input pseudo-point cloud based on the projection matrix of the infrared camera;

generating infrared UV pixel coordinates of the input pseudo-point cloud based on the infrared image;

determining a projection matrix of the visible camera based on an inner reference matrix and an outer reference matrix of the visible camera;

determining visible UV pixel coordinates of the input pseudo-point cloud based on the projection matrix of the visible camera;

determining an initial pseudo-point cloud based on the three-dimensional coordinates of the input pseudo-point cloud, the infrared UV pixel coordinates of the input pseudo-point cloud, the visible UV pixel coordinates of the input pseudo-point cloud, the infrared image, and the visible light image;

determining the input pseudo-point cloud by disordering the initial pseudo-point cloud and filtering out outlier point coordinates in the initial pseudo-point cloud based on a range constraint; and obtaining the aggregated point cloud by aggregating the LiDAR point cloud and the input pseudo-point cloud in the Euclidean space.

5. The method of claim 4, wherein the for the aggregated point cloud, extracting a multi-source feature using a backbone network includes:

voxelating the aggregated point cloud;

extracting a feature of a true point cloud in a voxelized aggregated point cloud and a feature of the pseudo-point cloud, respectively, by using a sparse convolution;

obtaining an initial aerial view feature by compressing the feature of the true point cloud in the three-dimensional space in a height axis direction; and extracting an aerial view feature using a traditional convolution based on the initial aerial view feature.

6. The method of claim 1, further comprising:

determining, in response to outputting the detection result, a motion characteristic of the target based on position information of at least one target in the detection result at a plurality of consecutive moments;

evaluating a collision risk between each of the at least one target and a vehicle based on the motion characteristic of the target; and adjusting a detection parameter within a predetermined future time interval based on the collision risk, wherein the detection parameter includes a range constraint.

7. The method of claim 6, wherein the evaluating a collision risk between each of the at least one target and a vehicle based on the motion characteristic of the target includes:

evaluating the collision risk between each of the at least one target and the vehicle through a collision model based on the motion characteristic of the target, a target distance, a size of the target, and an established driving parameter of the vehicle, the collision model being a machine learning model.

8. The method of claim 6, wherein the detection parameter further includes a count of layers of a multi-layer pyramid.

9. The method of claim 1, further comprising:

in an actual scene, collecting the target and a sample infrared image, a sample visible light image, and a sample LiDAR point cloud corresponding to the target to construct a training dataset based on a predetermined ratio, wherein the training dataset includes a plurality of first training samples; and the predetermined ratio includes a proportion of the target at different distances from a vehicle; and determining a learning rate corresponding to different first training samples of the same training dataset during a training process of a neural network based on a size of the target and a target distance in the training dataset.

10. The method of claim 9, wherein the determining a learning rate corresponding to different first training samples of the same training dataset during a training process of a neural network based on a size of the target and a target distance in the training dataset includes:

determining the learning rate corresponding to different first training samples of the same training dataset during the training process of the neural network based on sizes of the different targets in the training dataset and a collision risk corresponding to the target distance in historical data.

* * * * *